(No Model.) 4 Sheets—Sheet 1.

J. NAYLOR.
MACHINE FOR TRIMMING BUTTONS.

No. 448,848. Patented Mar. 24, 1891.

WITNESSES:
E. B. Bolton

INVENTOR:
Joseph Naylor
By Henry Connett
Attorney.

(No Model.) 4 Sheets—Sheet 2.

J. NAYLOR.
MACHINE FOR TRIMMING BUTTONS.

No. 448,848. Patented Mar. 24, 1891.

WITNESSES:
E. B. Bolton

INVENTOR:
Joseph Naylor
By Henry Connett
Attorney.

(No Model.) 4 Sheets—Sheet 3.
J. NAYLOR.
MACHINE FOR TRIMMING BUTTONS.

No. 448,848. Patented Mar. 24, 1891.

WITNESSES:

INVENTOR:
Joseph Naylor,
By Henry Connett
Attorney.

(No Model.) 4 Sheets—Sheet 4.
J. NAYLOR.
MACHINE FOR TRIMMING BUTTONS.
No. 448,848. Patented Mar. 24, 1891.
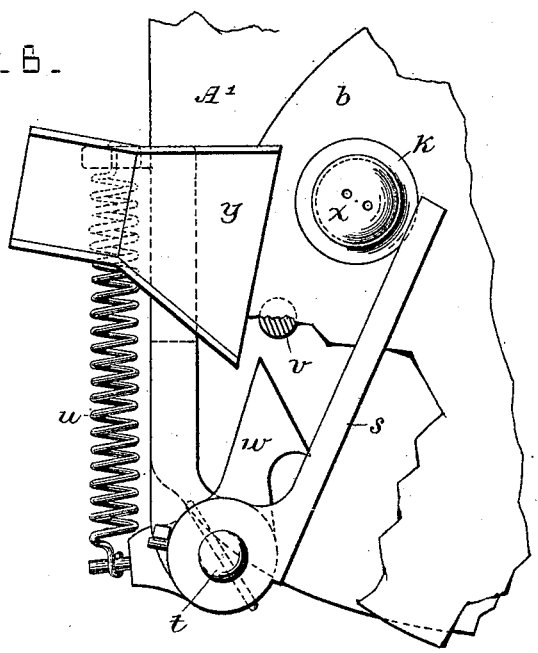
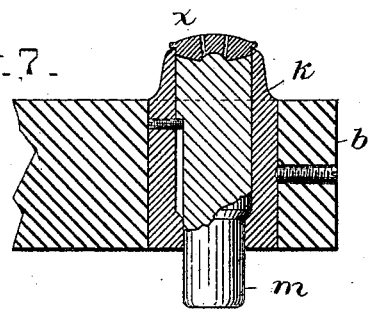
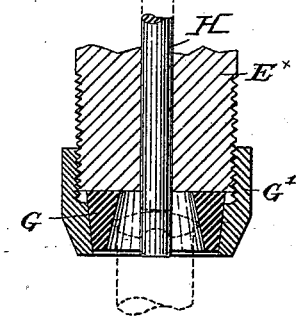
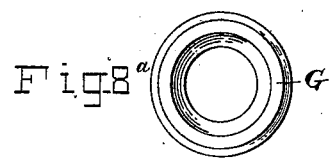
WITNESSES:
INVENTOR:
Joseph Naylor
By Henry Connett
Attorney.

UNITED STATES PATENT OFFICE.

JOSEPH NAYLOR, OF BLOOMFIELD, NEW JERSEY.

MACHINE FOR TRIMMING BUTTONS.

SPECIFICATION forming part of Letters Patent No. 448,848, dated March 24, 1891.

Application filed June 10, 1890. Serial No. 354,977. (No model.)

*To all whom it may concern:*

Be it known that I, JOSEPH NAYLOR, a citizen of the United States, residing at Bloomfield, Essex county, New Jersey, have invented certain Improvements in Machines for Trimming Buttons and Similar Articles, of which the following is a specification.

My invention relates to a machine adapted for trimming the margins or edges of buttons and similar articles generally of a circular form molded from plastic materials. It is well understood that when buttons are molded from plastic materials under pressure in dies or molds there is left on the margin or edge of the button a slight "fin," which is superfluous and must be removed, and in a patent granted to me August 30, 1887, No. 369,070, I show and describe a machine for this purpose. In that machine, however, the operation is not automatic, and the work is not done with sufficient rapidity to be economical, owing to the low price at which such articles must be made. My present machine is substantially automatic in its operation, and the work may be effected very rapidly and efficiently, as the attendant has merely to place the button or other article in the machine, the trimming and discharging thereof being effected automatically.
The invention will be fully described hereinafter, and its novel features carefully defined in the claims.

Figure 1:
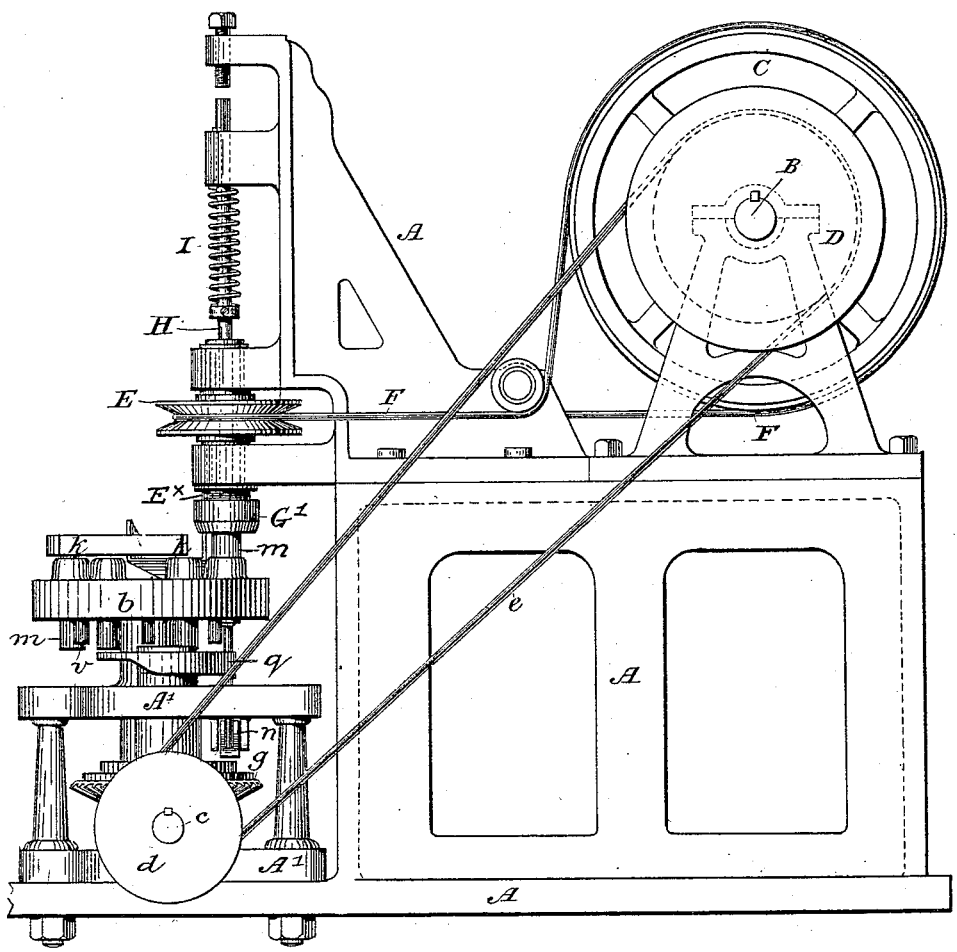
Figure 2:
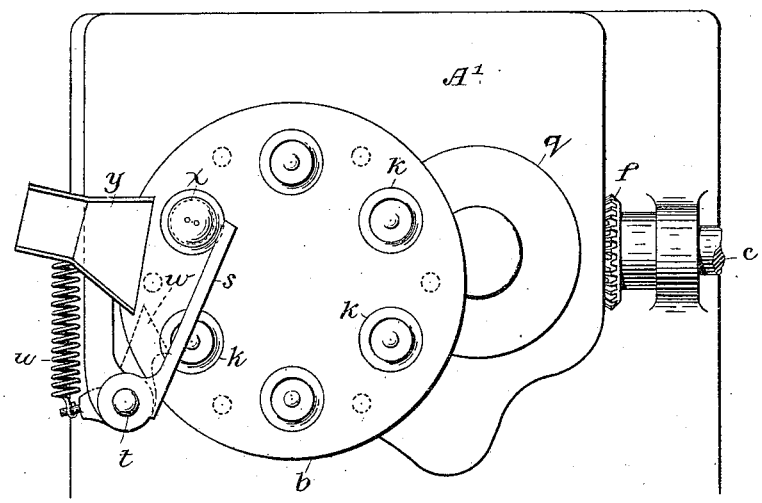
Figure 3:
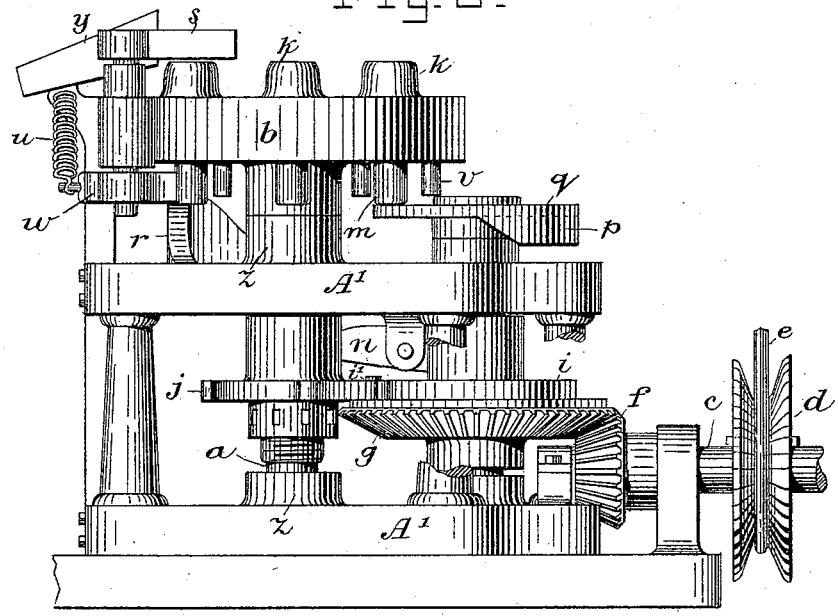
Figure 4:
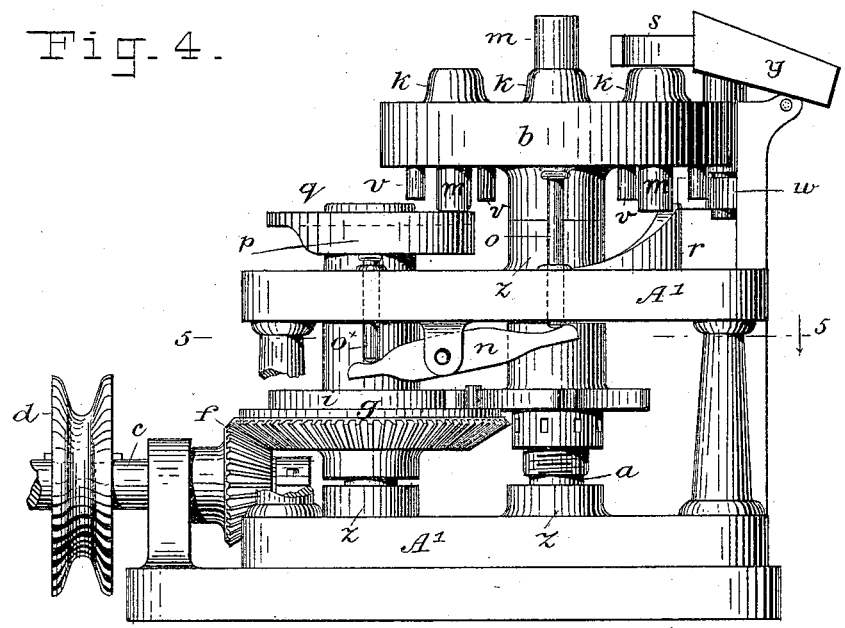
Figure 5:
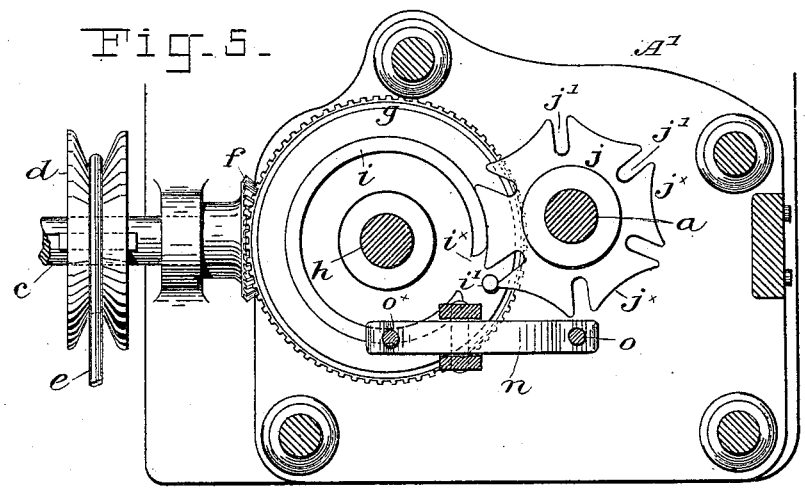

In the accompanying drawings, which serve to illustrate my invention, Figure 1 is a side elevation of the machine on a comparatively small scale. Fig. 2 is a plan view of the lower portion of the machine, in which part the principal novel features are embodied. This view is on a larger scale than Fig. 1. Fig. 3 is a front elevation of the lower portion of the machine on the same scale as Fig. 2, and Fig. 4 is a rear elevation of the same. Fig. 5 is a sectional plan view taken in the plane indicated by the line 5 5 in Fig. 4. Fig. 6 is a fragmentary plan view, on a large scale, of the device for discharging the button. In this view a part of the intermittently-rotating table is broken away in order to disclose the mechanism below it. Fig. 7 is an enlarged sectional detail view that will be hereinafter described. Figs. 8 and 8$^a$ are enlarged detached views illustrating the trimmer and the means for detachably securing it to the shaft.

Before proceeding to minutely describe the machine I will say that it comprises an upper portion, which is or may be substantially the same as that shown in my former patent, and a lower portion, which contains the principal novel features of the invention.

A represents the main frame of the machine; B, the driving-shaft, and C and D driving-pulleys thereon.

The upper portion of the machine, which is substantially the same as the upper portion of the machine described and illustrated in my former patent, consists of a pulley E, mounted rotatively in a part of the frame, with its hollow shaft vertically arranged, said pulley being driven by a belt F from the pulley C. On the hollow axis or shaft of the pulley E is secured the hollow trimmer G, which will be hereinafter described. Down through the hollow axis of the pulley E passes a rod H, which has a splined sliding bearing in the frame. The lower end of this rod projects down into the hollow of the trimmer G, and on its upper portion is a spring I, which tends to press the rod downward elastically. The function of this rod H will be hereinafter explained.

I will now describe the lower portion of the machine. In a part A' of the frame is mounted an upright shaft $a$, on the top of which is fixed a horizontal table $b$. This table is rotated intermittently during the operation of the machine by mechanism that I will now describe. On a counter-shaft $c$, mounted in the frame A', is a pulley $d$, which is driven from the pulley D by a belt $e$. On this shaft $c$ is a bevel-pinion $f$, which gears with a bevel-wheel $g$, fixed on an upright shaft $h$. On the wheel $g$ is a circular rim $i$, having a peripheral surface concentric with the axis of the wheel, (see Fig. 5,) and in this rim is a recess $i^x$, opposite which is set in the upper surface of the wheel $g$ a stud $i'$. On the shaft $a$ is fixed a hexagonal star-wheel $j$, which has six concave sides $j^x$, curved to fit the convex periphery of the rim $i$, and six radial slots $j'$ in its respective angles to receive the stud $i'$. The relative arrangement of the rim $i$ and star-wheel $j$ is clearly shown in Fig. 5. Continuous rotation of the wheel $g$ imparts intermittent rotation to the table $b$ through the medium of the stud $i'$ and star-wheel $j$, each rotation of the wheel $g$ imparting one-sixth of a complete rotation to the table $b$. This device, comprising the circular rim $i$, stud $i'$, and star-wheel $j$, is an ordinary device for converting continuous rotary motion into intermittent rotary motion, and I do not specifically claim it herein. Other known devices for the purpose may also be substituted for it.

In the table $b$ are set six equally-spaced tubular sockets $k$, one of which is shown in the sectional detail view, Fig. 7. In each socket $k$ is mounted a vertically-sliding plunger or lifter $m$. When the table $b$ is intermittently rotated, these lifters are brought in regular order or succession under the trimmer G and into axial alignment therewith.

The attendant places a button $x$ on the top of the lifter $m$ at the front of the machine, and when this lifter is brought into position in its order or succession under the trimmer the said lifter is forced upward, carrying with it the button, until the latter strikes the rod $h$, which is forced upward in turn. The button clamped between the ends of the lifter and rod, and thus held against rotation, is pressed upward into the conical hollow of the rapidly-rotating trimmer G, which trims the fin off from its edge and smooths it. The lifter now descends to its first position, and the next movement of the table $b$ carries the button around to the discharging-point, where it is knocked or pushed off from its seat and passes down a chute. This movement brings the next succeeding lifter under the trimmer.

The mechanism for forcing the lifter up to the trimmer is best illustrated in Fig. 4. A rocking lever $n$ is mounted on the upper plate of the frame A', and a pin $o$, which plays through a hole in the upper plate of said frame, rests at its lower end on one extremity of said lever $n$. This pin is axially aligned with the trimmer G. Another pin $o^x$ rests on the other extremity of the lever $n$ and plays through an opening in the upper plate of the frame. Now when this pin $o^x$ is depressed it acts through the lever $n$ to elevate the pin $o$, and this latter pin takes under the lifter $m$, which may be at the moment standing under the trimmer, and raises said lifter, as before described. The pin $o^x$ is depressed by a cam $p$, formed on the lower face of a horizontally-arranged cam-disk $q$, fixed on the upper extremity of the shaft $h$. This cam-disk is continuously rotated, and at each rotation it effects at the proper time and for the proper length of time the elevation of the lifter $m$ under the trimmer. When the lifter descends to its lowest point, the button $x$ is partially inclosed and retained in place by the socket $k$, and in order to elevate the button above said socket at the discharging-point, so that it may be conveniently knocked off the lifter by a lateral movement, a cam $r$ is provided. The lower extremity of the lifter in moving from the trimming-point to the discharging-point rides up on this cam, and the button is thus raised to the point where the vibrating knocker or sweep $s$ can strike it. This sweep is mounted on an upright shaft $t$, which rocks in bearings on the frame and is retracted by a spring $u$. When the table $b$ moves, carrying the button from the trimming-point to the discharging-point, as the button nears the discharging-point one of a series of six studs, pins, or protuberances $v$, projecting down from the lower face of the table $b$, strikes the inclined or beveled face of a cam-arm $w$ on the upright shaft $t$ and rocks said shaft, thus causing the sweep $s$ to knock or push the button $x$ from the lifter into an off-bearing chute $y$. As soon as the stud $v$ passes the cam-arm $w$ the spring $u$ retracts the parts.

My object in constructing the sockets $k$ to fit into and be removably secured in apertures in the table $b$ and in constructing the lifters $m$ to fit into these sockets is to better adapt the one machine for trimming buttons and the like of different sizes and patterns within limits. The sockets for one machine will all have the same diameter externally, but they will be bored out internally to receive lifters of different diameters. The lifter will usually have the same diameter as the button to be trimmed, and its upper extremity will usually have a contour to fit that of the face of the button. The attendant places the button in the socket face down on the lifter, the body of the button thus resting in a shallow cup or recess, as indicated in Fig. 7. The lifter $m$ is supported in the socket $k$ by a shoulder on the lifter, which rests normally on a corresponding shoulder or seat on the inner wall of the socket. The seat is formed in the socket by counterboring it, as clearly shown in said Fig. 7. It should be understood, however, that this mode of constructing the sockets $k$ is not essential to my invention, as when the machine is in operation they are a part of the table $b$, and it would be feasible to form them integrally therewith.

In my present machine no provision is made for punching holes in the buttons, that being otherwise effected.

I have described the mechanism precisely as illustrated in the drawings; but it will be obvious that some changes therein may be made without materially departing from my invention. For example, the table $b$ may have more or less than six lifters mounted in it, the device for converting continuous rotary into intermittent rotary motion being varied accordingly.

In my former patent the trimmer G was described as made of steel with internal cutters, and this will serve the purpose; but I prefer to and do now construct said trimmer of emery compound, such as is usually employed in emery-wheels. This trimmer is more economical than one of steel, in that it lasts longer and the first cost is less.

In Figs. 8 and 8ª I have shown the form of the trimmer G and illustrated the means employed for securing it detachably but firmly to the hollow shaft $E^\times$ of the pulley E.

Fig. 8 is a sectional elevation of the parts, and Fig. 8ª is an under side plan view of the trimmer G detached. The trimmer is annular or ring-like and is made conical both externally and internally, the inner conical surface serving to trim off the fin from the button and the outer surface fitting into a conical sleeve G′, which is secured to the end of the shaft $E^\times$ by a screw-thread. This sleeve draws the trimmer up tightly against the end of said shaft, and by tightly embracing the coned exterior surface of the trimmer prevents the latter from rotating.

In order to prevent the accumulation of dust and grit from the trimmer from getting into the bearings, I raise these latter above the level of the two plates of the frame A′, as seen at $z$.

Having thus described my invention, I claim—

1. The combination, with the rotating trimmer, of the intermittently-rotating table $b$, the series of lifters $m$, mounted in and carried by said table and adapted to slide in bearings therein and to be brought in succession under said trimmer by the intermittent rotation of the table, and means, substantially as described, for elevating the lifter while under the trimmer.

2. The combination, with the rotating trimmer, of the intermittently-rotating table $b$, the series of lifters $m$, mounted in said table and adapted to be brought in succession under said trimmer by the intermittent rotation of the table, and the means for elevating said lifters, comprising the rocking lever $n$, the pins $o$ and $o^\times$, which rest on the respective ends of said lever, and the rotating cam $p$, adapted to depress the pin $o^\times$, substantially as set forth.

3. The combination, with the intermittently-rotating table $b$, provided with a series of pins $v$, the series of lifters $m$, mounted in said table, and the cam $r$ for raising said lifters, of the discharging device comprising the sweep $s$, its shaft $t$, the retracting-spring $u$, and the cam-arm $w$, arranged in the path of the pins on the table, substantially as set forth.

4. The combination, with the apertured table $b$, of the series of tubular sockets $k$, set removably therein, and the series of lifters $m$, mounted in said sockets and carried by said table, whereby the machine is adapted to operate on articles of different sizes, as set forth.

5. In a trimming-machine for buttons and the like, the combination, with the tubular shaft $E^\times$ and the rod H within the same, of a holder on the end of said shaft and the ring-like trimmer G, of emery composition, coned both interiorly and exteriorly and secured to the end of said shaft by said holder, the rod H being adapted to play through said trimmer.

In witness whereof I have hereunto signed my name in the presence of two subscribing witnesses.

JOSEPH NAYLOR.

Witnesses:
HENRY CONNETT,
J. D. CAPLINGER.